No. 618,927.  
A. R. YARBROUGH.  
PLOW.  
(Application filed Sept. 29, 1898.)  
(No Model.)  
Patented Feb. 7, 1899.  
2 Sheets—Sheet I.

Witnesses  
Inventor  
Asa R. Yarbrough,  
By his Attorneys,

No. 618,927. Patented Feb. 7, 1899.
A. R. YARBROUGH.
PLOW.
(Application filed Sept. 29, 1898.)
(No Model.) 2 Sheets—Sheet 2.
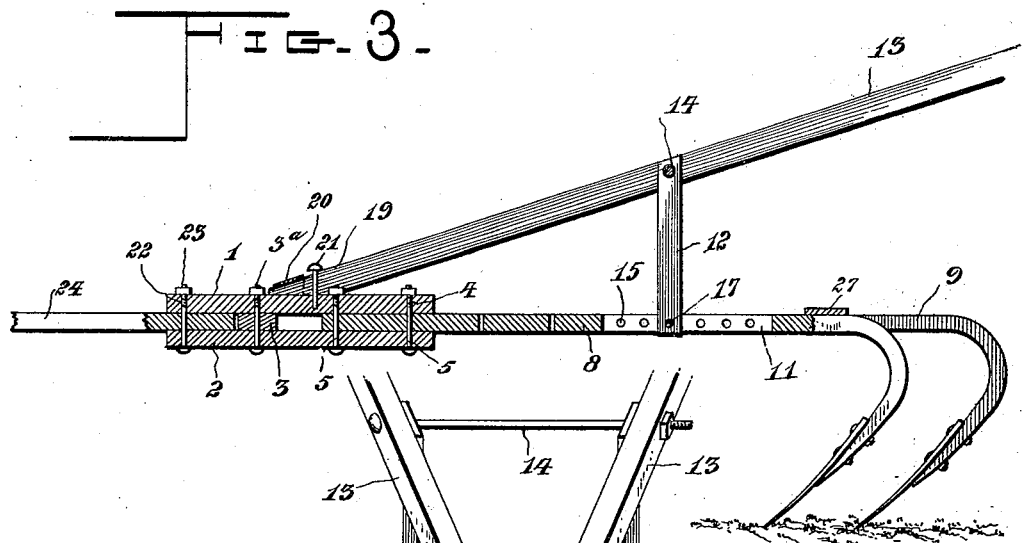
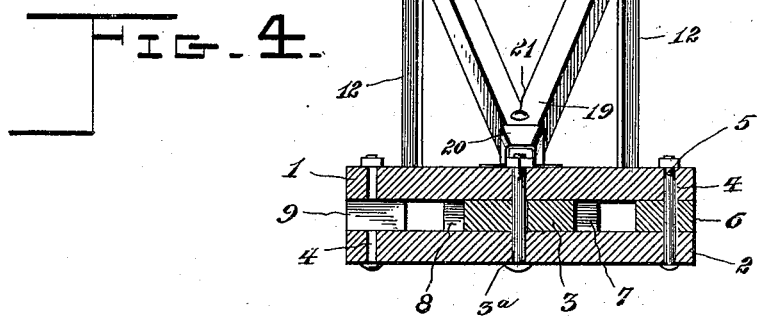
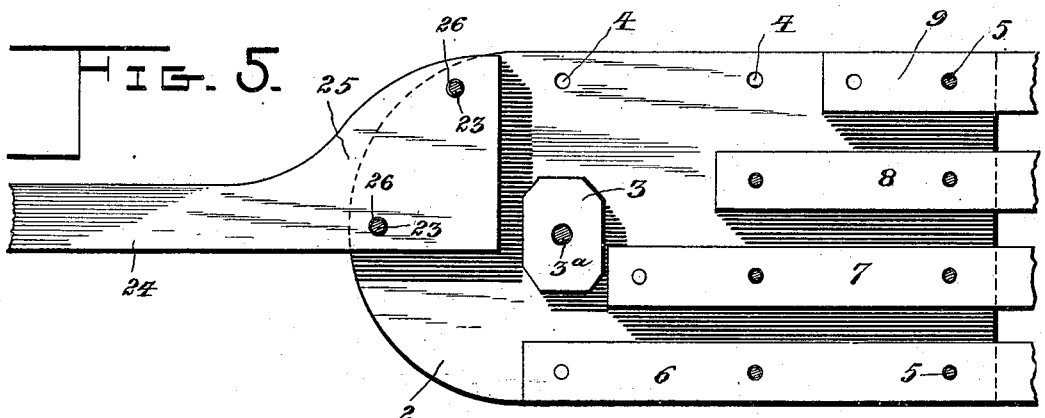
Witnesses
John F. Denfenvid
J. F. Riley
Inventor
Asa R. Yarbrough,
By his Attorneys, C. A. Snow & Co.

UNITED STATES PATENT OFFICE.

ASA RICHMOND YARBROUGH, OF STEPHENS, ARKANSAS.

PLOW.

SPECIFICATION forming part of Letters Patent No. 618,927, dated February 7, 1899.

Application filed September 29, 1898. Serial No. 692,202. (No model.)

*To all whom it may concern:*

Be it known that I, ASA RICHMOND YARBROUGH, a citizen of the United States, residing at Stephens, in the county of Ouachita and State of Arkansas, have invented a new and useful Plow, of which the following is a specification.

The invention relates to improvements in plows.

The object of the present invention is to improve the construction of plows and to provide a simple, inexpensive, and efficient one adapted to be drawn by either one or two horses and capable of having its draft mechanism arranged so that when one horse is used it may walk in the furrow at either side of a drill or row or in the center.

A further object of the invention is to provide a plow adapted to have its beams readily adjusted and its shovels conveniently changed to enable it to be arranged as a one-horse side harrow, a cultivator or land-breaker, or a breast-harrow, either double or single.

Another object of the invention is to provide a plow adapted to cultivate both sides of a row with one horse and capable of permitting it to walk in the furrow at either side of the row.

The invention consists in the construction and novel combination and arrangement of parts, as hereinafter fully described, illustrated in the accompanying drawings, and pointed out in the claims hereto appended.

Figure 1:
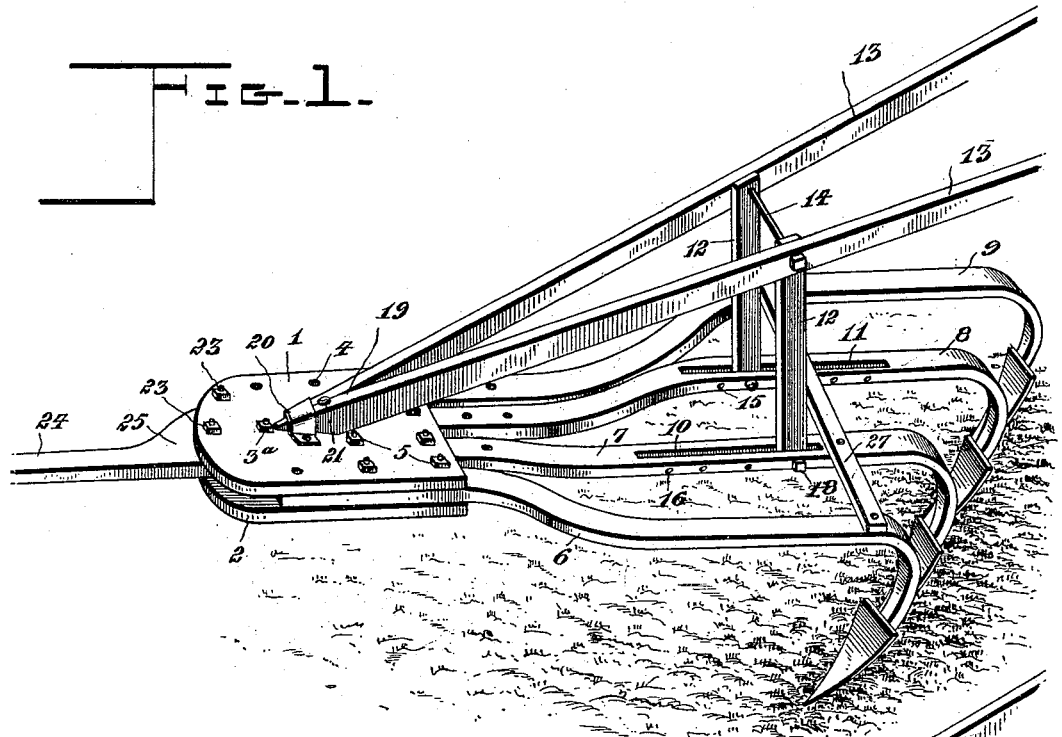
Figure 2:
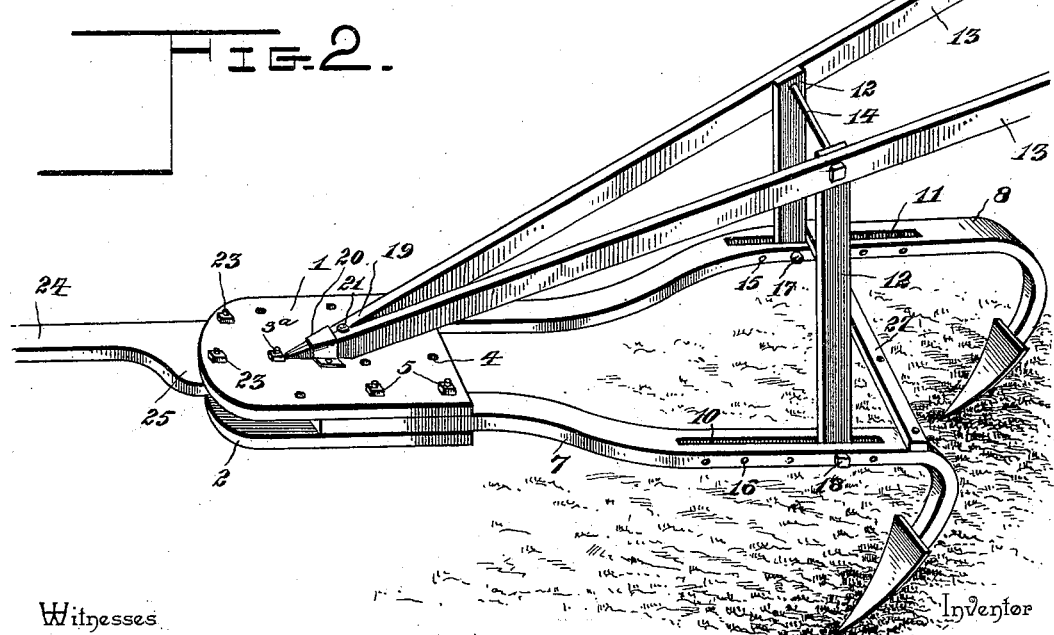

In the drawings, Figure 1 is a perspective view of a plow constructed in accordance with this invention and arranged to form a one-horse side harrow. Fig. 2 is a perspective view, the plow being arranged for cultivating both sides of a row and to permit a horse to walk between the rows. Fig. 3 is a longitudinal sectional view, the parts being arranged as shown in Fig. 1. Fig. 4 is a transverse sectional view. Fig. 5 is a horizontal sectional view of the front portion of the plow, the beams and the adjustable and reversible clevis-plate being shown in plan view.

Like numerals of reference designate corresponding parts in all the figures of the drawings.

1 and 2 designate upper and lower attachment-plates spaced apart by a block 3, located in advance of the center of the plate and secured to the same by a bolt $3^a$ or other suitable fastening device. The rear portions of the plates 1 and 2 are provided with longitudinal series of registering perforations 4, adapted to receive bolts 5 for securing adjustable and detachable plow-beams 6, 7, 8, and 9 to the plates, and the said beams are provided with perforations and are adapted to be adjusted longitudinally of the plow to arrange their rear ends in advance or in rear of one another. The rear ends of the beams are curved outward in the usual manner and are adapted to receive various kinds of cultivator teeth or shovels to arrange the plow for different kinds of work.

The beams 6 and 7 are slightly bent or offset in rear of the plates 1 and 2 to deflect and spread their rear portions, and the deflected portions of the beams 6 and 7 are disposed toward one side of the plow, while those of the beams 8 and 9 are disposed toward the opposite side of the same. The central beams 7 and 8 are provided with longitudinal slots 10 and 11, in which are secured the lower ends of braces 12 for supporting a pair of plow-handles 13, and the latter, which have their lower ends mounted upon the plate 1, are connected by a transverse rod 14, which passes through the upper ends of the braces 12. The lower ends of the braces 12 are secured to the beams 7 and 8 by bolts and nuts, and series of perforations 15 and 16 are provided to receive the bolts 17 and 18, whereby the beams 8 and 9 may be adjusted longitudinally without interfering with the arrangement of the plow-handles. The lower ends 19 of the plow-handles are tapered and fitted in a socket or clip 20, being held against rearward movement and consequent displacement by a fastening device 21, located in rear of the clip or socket and passing through grooves of the adjacent faces of the plow-handles.

The front portions of the plates 1 and 2 are rounded and provided with registering perforations 22 to receive fastening devices 23 for securing a draft-beam 24 to the plow, and this draft-beam, which consists of a stem and a laterally-disposed enlargement or extension 25, is adapted to be adjusted and reversed to bring the stem at the center of the plow, as illustrated in Fig. 1 of the accompanying drawings, or to arrange it at one side, as shown in Fig. 2. By reversing the beam to bring the enlargement or extension 25 at the inner or outer side of the stem the latter may be arranged at the center or side of the plow, and the clevis-plate can be adjusted from one side of the latter to the other to bring the stem at either side of the plow. The rear portion of the draft-beam is provided with perforations 26, adapted to register with those of the attachment-plates. The plow-beams are supported by a transverse brace 27, detachably secured to the same and located in rear of the upright supports or braces 12, and it is adapted to be readily disconnected from the braces to permit the beams to be removed or adjusted.

The invention has the following advantages: The plow-beams may, as illustrated in Fig. 1 of the accompanying drawings, be arranged with their cultivator-teeth one in advance of the other to form a side harrow, and when in this position it will also serve as a cultivator or land-breaker. The beams 6, 7, 8, and 9 may be adjusted to bring their rear ends in line with each other to form a breast-harrow, and when arranged in this position one or two horses may be hitched to the plow. The beams 6 and 9 can also be arranged to bring their cultivator-teeth in rear of those of the inner beams 7 and 8, and then the plow is adapted to be used as a side harrow or cultivator. Either one or two horses may be employed with this arrangement, and when cultivating both sides of a row in this manner the draft-beam may be reversed or arranged to permit a single horse to walk at either side of the row. This last position may be reversed by arranging the outer beams 6 and 9 in advance of the inner beams 7 and 8.

When two beams are employed, as illustrated in Fig. 2 of the accompanying drawings, the cultivating devices carried by their downwardly-curved rear portions may be arranged directly opposite each other or either may be located in advance of the other, and the cultivating devices may be changed to suit the character of the work to be performed.

Changes in the form, proportion, and minor details of construction may be resorted to without departing from the spirit or sacrificing any of the advantages of this invention.

What I claim is—

1. In a device of the class described, the combination of the upper and lower plates spaced apart, plow-beams having their front ends adjustably secured between the rear portions of the plates, and a draft-beam mounted between the front portions of the plates, substantially as described.

2. In a device of the class described, the combination of the upper and lower plates spaced apart, plow-beams adjustably mounted between the rear portions of the plates, and the reversible and adjustable draft-beam mounted between the front portions of the plates and adapted to be arranged at either the center or the sides of the plow, substantially as described.

3. In a device of the class described, the combination of the upper and lower plates, plow-beams mounted between the rear portions of the plates, and the draft-beam adjustably secured between the front portions of the plates and having a lateral extension or enlargement and adapted to be reversed to bring it either at the center or sides of the plow, substantially as described.

4. In a device of the class described, the combination of the upper and lower plates spaced apart, plow-beams secured between the rear portions of the plates and provided with longitudinal slots, converging plow-handles secured at their front ends to the upper plate, and the braces having their upper ends attached to and supporting the plow-handles and adjustably secured at their lower ends in the slots of the plow-beams, substantially as described.

5. In a device of the class described, the combination of the upper and lower plates provided at their front and rear portions with perforations, the adjustable plow-beams 6, 7, 8 and 9 provided with perforations and arranged between the rear portions of the upper and lower plates, the draft-beam having a lateral extension or enlargement arranged between the front portions of the plates and provided with perforations, fastening devices passing through the said perforations and securing the said beams to the plates, and the plow-handles secured to the upper plate and supported by the plow-beams, substantially as described.

In testimony that I claim the foregoing as my own I have hereto affixed my signature in the presence of two witnesses.

ASA RICHMOND YARBROUGH.

Witnesses:
   THOS. S. HARDISON,
   R. W. YARBROUGH.